US012658791B2

(12) United States Patent
Medina-Garcia et al.

(10) Patent No.: US 12,658,791 B2
(45) Date of Patent: Jun. 16, 2026

(54) CONTROLLER FOR RESONANT POWER CONVERTER, RESONANT POWER CONVERTER AND METHOD OF OPERATING A RESONANT POWER CONVERTER

(71) Applicant: Infineon Technologies Austria AG, Villach (AT)

(72) Inventors: Alfredo Medina-Garcia, Munich (DE); Xiaojun Liang, Shenzhen (CN)

(73) Assignee: Infineon Technologies Austria AG, Villach (AT)

( * ) Notice: Subject to any disclaimer, the term of this patent is extended or adjusted under 35 U.S.C. 154(b) by 191 days.

(21) Appl. No.: 18/421,204

(22) Filed: Jan. 24, 2024

(65) Prior Publication Data

US 2024/0258911 A1 Aug. 1, 2024

(30) Foreign Application Priority Data

Feb. 1, 2023 (EP) ..................................... 23154458

(51) Int. Cl.
H02M 3/335 (2006.01)
H02M 1/32 (2007.01)
H02M 1/34 (2007.01)
H02M 3/00 (2006.01)

(52) U.S. Cl.
CPC ..................................... H02M 3/01 (2021.05)

(58) Field of Classification Search
CPC .......... H02M 1/322; H02M 1/83; H02M 1/34; H02M 3/33507; H02M 3/33569; H02M 3/33571; H02M 3/01
See application file for complete search history.

(56) References Cited

U.S. PATENT DOCUMENTS

| | | | |
|---|---|---|---|
| 10,170,974 B1 * | 1/2019 | Oh | H02M 1/32 |
| 2009/0251925 A1 | 10/2009 | Usui et al. | |
| 2019/0393795 A1 | 12/2019 | Odate et al. | |
| 2020/0328669 A1 | 10/2020 | Yang et al. | |
| 2022/0271674 A1 * | 8/2022 | Yang | H02M 3/33571 |
| 2023/0006544 A1 * | 1/2023 | Yang | H02M 3/33576 |
| 2023/0010711 A1 | 1/2023 | Mayell et al. | |
| 2024/0007000 A1 * | 1/2024 | Medina-Garcia | H02M 3/01 |
| 2024/0258911 A1 * | 8/2024 | Medina-Garcia | H02M 1/322 |
| 2024/0405685 A1 * | 12/2024 | Medina-Garcia | H02M 3/33507 |
| 2024/0429827 A1 * | 12/2024 | Xu | H02M 1/322 |
| 2025/0175085 A1 * | 5/2025 | Peng | H02M 1/32 |
| 2025/0226758 A1 * | 7/2025 | Medina-Garcia | H02M 1/385 |

(Continued)

OTHER PUBLICATIONS

Extended European Search Report, EP 23 15 4458, Jun. 30, 2023, pp. 1-8.

*Primary Examiner* — Sisay G Tiku
(74) *Attorney, Agent, or Firm* — Armis IP Law, LLC

(57) ABSTRACT

A controller for a resonant power converter is provided, comprising a control logic configured to control a high side switch and a low side switch of the power converter during normal operation, terminate normal operation in response to determining an exception condition, and after terminating normal operation, control one of the high side switch or low side switch to close for at least one time period to discharge a resonant capacitor of the power converter. Corresponding resonant power converters are also provided, as well as methods of operating such power converters.

22 Claims, 4 Drawing Sheets

(56)             References Cited

U.S. PATENT DOCUMENTS

2025/0286464  A1 *   9/2025   Lee ..................... H02M 1/0058
2025/0300565  A1 *   9/2025   Peng ................. H02M 3/33569

* cited by examiner

CONTROLLER FOR RESONANT POWER CONVERTER, RESONANT POWER CONVERTER AND METHOD OF OPERATING A RESONANT POWER CONVERTER

RELATED APPLICATION

This application claims priority to earlier filed European Patent Application Serial Number EP23154458 entitled "Controller for Resonant Power Converter, Resonant Power Converter and Method of Operating a Resonant Power Converter,", filed on Feb. 1, 2023, the entire teachings of which are incorporated herein by this reference.

TECHNICAL FIELD

The present application relates to controllers for resonant power converters, resonant power converters including such controllers and to corresponding methods of operating such resonant power converters.

BACKGROUND

Power converters are used in many applications to convert an input electrical power to an output electrical power, which is appropriate for a respective appliance or device with respect to voltage, current or both. For example, charger devices for smartphones or tablets or power supplies for computers, laptops and a plurality of other devices convert an input power, typically a mains power, to an appropriate output power (voltage and current). For instance, the mains power typically is an AC (alternating current) power with a voltage ranging between 100 volt and 300 volt depending on country, and output voltages required may be in a range from 3 volt to 20 volt DC (direct current), depending on application. Sometimes, power converters include a plurality of stages, for example a so called power factor correction stage providing an intermediate voltage, also referred to as bus voltage, and a second stage performing the actual regulation to a desired output voltage.

One type of power converters are resonant power converters, where during operation typically in a first phase power is provided to a resonant circuit including a capacitor (referred to as resonant capacitor herein) and at least one inductor, and in a second phase power is provided to an output side of the resonant converter. On the output side, the output signal is typically provided via an output capacitor. Examples for such resonant converters include active clamp flyback (ACF) converters or asymmetric half-bridge flyback (AHBF) converters.

Under some conditions, the power converter may be required to or forced to cease operation. Such conditions will be referred to as exception conditions herein and may include for example a disconnect from the input voltage like mains voltage (intentional or due to a power outage), turning off of a device including the power converter, overcurrent conditions, short circuit conditions and the like. In such an exception condition, in conventional solutions so called primary side switches, for example a high side switch and a low side switch provided in a half-bridge configuration, are switched off. When restarting the power converter, remaining charges may lead to unwanted current surges.

SUMMARY

A controller as defined includes a resonant power converter.

According to an embodiment, a controller for a resonant power converter is provided, comprising a control logic configured to:
- control a high side switch and a low side switch of the power converter during normal operation,
- terminate normal operation in response to determining an exception condition, and
- after terminating normal operation, control one of the high side switch or low side switch to close for at least one time period to discharge a resonant capacitor of the power converter.

In another embodiment, a resonant power converter including such a controller is provided. The resonant power converter further comprises a half-bridge including the high side switch and the low side switch coupled between a first supply voltage potential and a second supply voltage potential, and the resonant capacitor coupled with the one of the high side switch or low side switch in a closed loop with a primary side inductance of a transformer.

According to a further embodiment, a method is provided, comprising:
- controlling a high side switch and a low side switch of a power converter during normal operation,
- terminating normal operation in response to determining an exception condition, and
- after terminating normal operation, controlling one of the high side switch or low side switch to close for at least one time period to discharge a resonant capacitor of the power converter.

The above summary merely gives a short overview over some embodiments and is not to be construed as limiting in any way, as other embodiments may include different features than the ones listed above.

DETAILED DESCRIPTION

Figure 1:
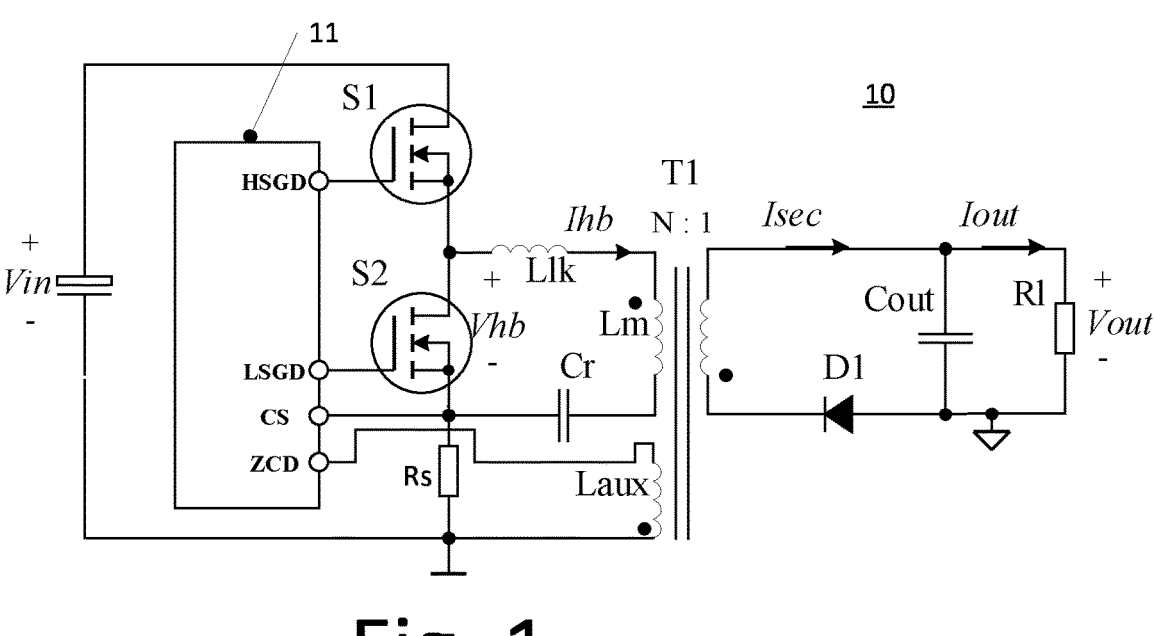
FIG. 1 is a circuit diagram of a resonant power converter according to an embodiment, including a controller according to an embodiment.

In the following various embodiments will be described in detail referring to the attached drawings. These embodiments are given by way of example only and are not to be construed as limiting in any way.

While embodiments are described including a plurality of features (elements, components, steps, acts, events, signals etc.) in other embodiments some of these features may be omitted, or may be replaced by alternative features. For example, some embodiments are described in the context of specific types of resonant power converters, but techniques discussed herein may also be applied to other kinds of resonant power converters. Furthermore, in addition to the features explicitly shown and described, further features may be provided for example features of conventional resonant power converters and are associated methods. For instance, the present application focusses on discharging a resonant capacitor after a normal operation of the power converter has terminated. Other aspects like the general configuration of the power converter or the normal operation of the power converter like the regulation of an output voltage or output current may be implemented in any conventional manner.

Features from different embodiments may be combined to form further embodiments. Variations, modifications or details described with respect to one of the embodiments are also applicable to other embodiments and will therefore not be described repeatedly.

Couplings or connections described herein refer to electrical connections or couplings unless noted otherwise. Such connections or couplings as shown in the drawings or described herein may be modified, for example by the addition or removal of components, as long as the general function of the connection or coupling, for example to provide a certain kind of signal, to provide a voltage, to provide power etc. is essentially maintained.

Embodiments discussed herein include switches. A switch is referred to as off or open if it essentially provides an electrical isolation between its terminals, and is referred to as on or closed when it provides a low ohmic conducting power path between its terminals. Switches are usually implemented as transistors, for example field effect transistors, bipolar junction transistors or insulated gate bipolar transistors. To increase voltage handling capabilities of such a switch, a plurality of transistor cells may be coupled in series, and/or to increase current handling capabilities, a plurality of transistor cells may be coupled in parallel. Therefore, while in some embodiments discussed herein switches are depicted as simple transistors, this is not to be construed as limiting, and other switch implementations using other types of transistors or a plurality of transistor cells may also be used. It should be noted that the operation of a transistor may deviate from the above ideal behaviour to some extent. For example, a transistor may be operated in a linear range, such that in the off-state there is still some current flowing, and in the on-state there is still some electrical resistance. However, also in this case, the electrical resistance in the off-state is significantly higher than in the on-state, for example at least a factor of 2 higher, at least a factor of 5 higher, at least a factor of 10 higher or at least a factor of 100 higher. Such non-ideal on and off states still fall under the terms on/closed or off/open as defined above.

Normal operation of a power converter as used herein refers to a state where the power converter is operated to provide an output power (output voltage and output current) based on a received input electrical power (input voltage and input current). For example, for resonant power converters this normal operation often involves alternatingly closing and opening a high side switch and a low side switch, to provide a resonant circuit of the resonant power converter with electrical power in one phase and transfer the electrical power to an output in another phase.

Such a normal operation may be terminated for a variety of reasons. A condition leading to determination of normal operation is referred to as exception condition herein. Such an exception condition may include error cases, for example the occurrence of an overvoltage or an overcurrent, as well as an intentional termination of normal operation, for example when a device including the power converter is switched off or put to a power saving mode, where operation of the power converter is not required. A further example for an exception condition is a separation of the power converter from its input electrical power, which can be either due to a fault condition, for example a blackout or brownout, or also an intentional condition like a user unplugging a device from a mains power socket. Detection of such exception conditions can be done in any conventional manner. For example, various conventional ways for monitoring the output current or output voltage for overcurrent conditions, short circuit conditions or the like exists, and also the input electrical power may for example be monitored by monitoring an input voltage. Therefore, the detection of the exception condition will not be described in detail. Instead, embodiments described herein will focus on what happens after the exception condition occurs. Conventionally, the power converter is merely switched off, for example both high side switch and low side switch of the power converter are set to an off-state. Instead, in embodiments described herein, before for example switching the power converter off, at least one switch of the power converter is operated to discharge a resonant capacitor of the power converter. In case of a separation from the input power or other power failure as exception condition, a capacitor or other auxiliary power source may be provided to enable a controller and/or one or more drivers to operate the at least one switch to perform the discharge as described herein. Such a capacitor may for example receive the input voltage or a voltage derived therefrom to charge during normal operation, and the stored charge may then be used to power the controller and/or the drivers.

In accordance with one example as discussed herein, a controller includes control logic operative to:

control a high side switch and a low side switch of a resonant power converter during a normal operation mode; terminate execution of the resonant power converter in the normal operation mode in response to determining an exception condition; and after terminating the execution of the resonant power in the normal operation mode, control operation of the high side switch and the low side switch for at least one time period to discharge a resonant capacitor of the resonant power converter.

As further discussed herein, the high side switch and/or the low side switch can be coupled in a closed loop with the resonant capacitor and at least one inductance.

Still further, the controller can be configured to start the at least one time period based on a signal indicating a zero current flowing in the closed loop.

In a yet further example, the at least one time period may comprise a plurality of time periods separated by further time periods where at least one of the high side switch or the low side switch is open. A time duration of each of the plurality of time periods may be the same. Additionally, in or alternatively, the controller can be configured to set the time durations of the plurality of time periods depending on a signal indicating a voltage stored by the resonant capacitor.

Still further, the controller can be configured to start the at least one time period based on receiving a signal indicating a demagnetization of a primary side inductance of a transformer of the resonant power converter.

Note that the controlling of the high side switch and/or the low side switch for at least one time period is operative to discharge a resonant capacitor of the resonant power converter where no energy is transferred from the resonant power converter to an output of the resonant power converter.

Further, the controlling of one of the high side switch and the low side switch for at least one time period may discharge the resonant capacitor of the power converter resulting in energy transfer to an input of the resonant power converter.

Further examples herein include a resonant power converter, comprising: the controller as discussed herein and a half bridge circuit including the high side switch and the low side switch coupled between a first supply voltage potential and a second supply voltage potential, and wherein the resonant capacitor is coupled in a closed loop with a primary side inductance of a transformer.

Still further, the resonant power converter may be an asymmetric half bridge flyback converter or other suitable entity.

The high side switch and/or the low side switch are potentially implemented as transistor switches, wherein the controller is configured to operate the high side switch and the low side switch in in a linear range.

Further examples as discussed herein include a method comprising: controlling a high side switch and a low side switch of a resonant power converter during a normal operation mode; terminating execution in the normal operation mode in response to detecting an exception condition; and after terminating execution of the normal operation mode, controlling the high side switch for at least one time period to discharge a resonant capacitor of the resonant power converter.

Yet further, according to the method as discussed herein, the high side switch and/or the low side switch may be coupled in a closed loop with the resonant capacitor and at least one inductive component, the method may further comprise starting the at least one time period based on receiving a signal indicating a zero current flowing through the closed loop.

Still further example methods include condition in which the at least one period comprises a plurality of time periods separated by further time periods where the high side switch and the low side switch are controlled, the method may further include setting the time durations of the plurality of time periods depending on a received signal indicating a voltage at the resonant capacitor.

Another example as discussed herein includes a second method comprising: controlling a switch of a resonant power converter during a normal operation mode;
  terminating execution in the normal operation mode in response to detecting an exception condition; and
  after terminating execution of the normal operation mode, controlling the switch for at least one time period to discharge a resonant capacitor of the resonant power converter.

In one example, the switch is coupled in a closed loop with the resonant capacitor and at least one inductive component, the second method further comprising starting the at least one time period based on receiving a signal indicating a zero current flowing through the closed loop.

In another example, the at least one time period comprises a plurality of time periods separated by further time periods where the is controlled, the second method further comprising setting the time durations of the plurality of time periods depending on a received signal indicating a voltage at the resonant capacitor.

Turning now to the Figures, FIG. 1 is a circuit diagram of a resonant power converter 10 according to an embodiment. Power converter 10 of FIG. 1 is implemented as an asymmetric half-bridge flyback power converter and includes a controller 11 according to an embodiment.

The term controller may refer to a single entity, as shown in FIG. 1 for controller 11, but may also refer to a plurality of entities communicating with each other, for example a primary side controller and a secondary side controller communicating with each other. Such controllers include a control logic for performing the functions described herein, for example implemented as an application specific integrated circuit (ASIC), a processor like a microcontroller programmed accordingly, or in any other manner, and may also include auxiliary circuits like drivers for driving transistor switches, analog-to-digital converters for receiving signals or digital-to-analog converters for outputting signals. In this respect, in case of a galvanic isolation as provided by a transformer T1 in FIG. 1, a primary side controller is an entity of the primary side, galvanically separated from the secondary side, and a secondary side controller is an entity of the secondary side, galvanically isolated from the primary side. Hence, in case of power converter 10 of FIG. 1, controller 11 is a primary side controller.

On a primary side, power converter 10 includes a high side switch S1 and low side switch S2, both represented as transistor switches, coupled in series between terminals of an input power supply, providing an input voltage Vin, symbolized by a battery in FIG. 1. The poles of Voltage Vin provided at terminals of the input power supply are examples for first and second supply voltage potentials supplied to power converter 10. Power converter 10 may also be part of a multistage power converter, where for example a bus voltage and ground serve as supply voltage potentials for power converter 10 and are for example derived from a mains input voltage by rectification and power factor correction.

A shunt resistor Rs may serve for measuring a current flowing on the primary side of power converter 10. The current may be measured by controller 11 via an input CS which is coupled to a node between low side switch S1 and shunt resistor Rs.

Low side switch S2 is coupled in a closed loop with an inductor Llk, a primary side winding Lm of transformer T1 and a resonant capacitor Cr. A current flowing through inductors Llk, Lm is designated Ihb in FIG. 1, and a voltage across low side switch S2 is labelled Vhb. High side switch S1 is controlled by controller 11 via a terminal HSGD, and low side switch S2 is controlled by controller 11 via a terminal LSGD.

During normal operation, high side switch S1 and low side switch S2 are alternatingly opened and closed.

Inductors Llk, Lm together with resonant capacitor Cr form a resonant circuit.

In normal operation of power converter 10, in a first phase in each switching period, high side switch S1 is closed and low side switch S2 is open, such that energy is transferred to the resonant circuit. In a second phase, high side switch S1 is open and low side switch S2 is closed, causing an energy transfer to a secondary side via transformer T1, such that a secondary current Isec flows. Secondary current Isec is rectified using a diode D1 and filtered by an output capacitor Cout to provide an output current Iout and output voltage Vout to a load represented by a resistor R1. While the load is represented by a resistor R1, it is to be understood that the load may also include inductive and capacitive components. Diode D1 may represent the diode of a MOSFET of a synchronous rectifier (SR) circuit provided on the secondary side of power converter 10.

Power converter 10 furthermore includes an auxiliary winding Laux on the primary side of transformer T1, which is coupled to a terminal ZCD of controller 11.

During normal operation, a voltage received at terminal ZCD may be used for controlling switches S1, S2 in a conventional manner, for example to obtain so called zero voltage switching. Also in a conventional manner, based on a voltage a terminal ZCD and/or at terminal CS, the output voltage or output current may be regulated. In other embodiments, controller 11 may receive an indication of the output voltage Vout and/or output current Iout from the secondary side of power converter 10, for example via an optocoupler bridging the galvanic isolation provided by transformer T1, also in a conventional manner. Generally, as already mentioned above, operation and regulation during normal operation of the power converter may be performed in any conventional manner.

When an exception condition as explained above occur, controller 11 terminates normal operation. Unlike conventional power converter controllers and power converters, when terminating the normal operation controller 11 does not simply turn switches S1, S2 off, but controller 11 controls low side switch S2 to close for at least one time period, in some embodiments to close and open repeatedly over a plurality of time periods, while high side switch S1 remains closed, in order to discharge capacitor Cr. After this discharging, also low side switch S2 may be switched off, such that power converter 10 is in a switched off state. As will be explained further below in some more detail, this may prevent current surges caused by charge stored in resonant capacitor Cr when restarting power converter 10 later. For example, in some instances and implementations power converter 10 may be restarted automatically after the exception condition has occurred when a predefined time period, for example 3 seconds, has elapsed. Such techniques are for example used when the exception condition is an error condition like an overcurrent condition, a drop of the input voltage Vin or a short circuit condition, which may be temporary.

Before explaining this discharge in more detail, a method according to an embodiment based on the above explanations, which may be implemented using controller 11 of FIG. 1, will be explained referring to FIG. 2.

Figure 2:
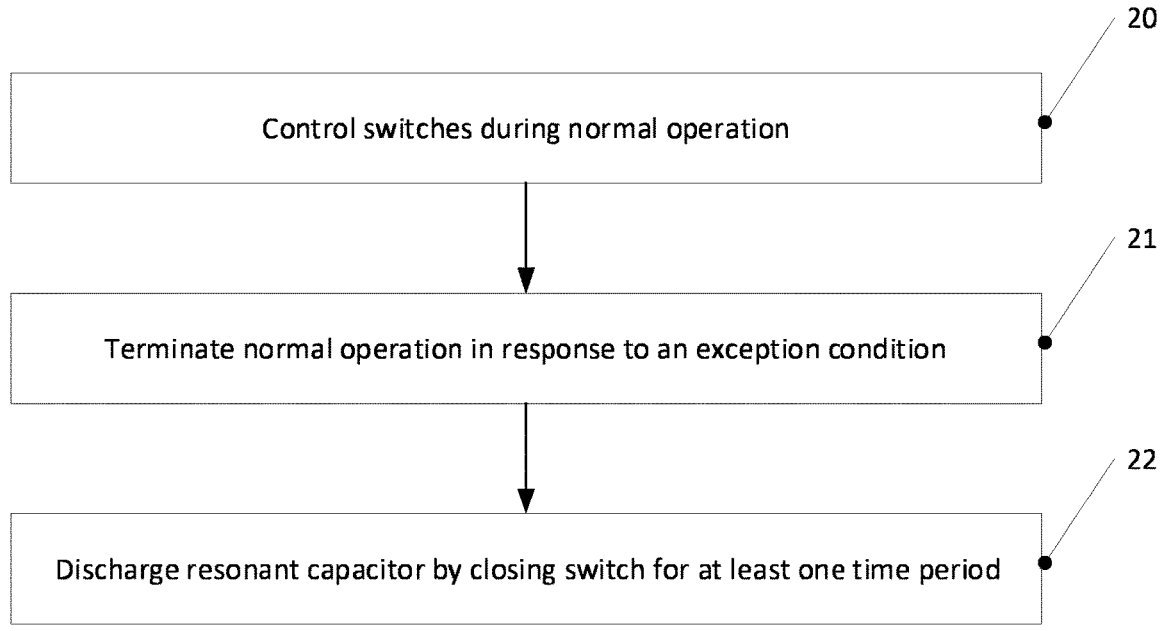
FIG. 2 is a flowchart illustrating a method according to an embodiment.

FIG. 2 is a flowchart illustrating a method according to an embodiment. In order to avoid repetitions, the method of FIG. 2 will be explained in the context of FIG. 1 and the previous explanations. However, the method of FIG. 2 may also be applied to other resonant power converters than the one shown in FIG. 1, for example the power converter explained with reference to FIG. 6 further below.

At 20, the method comprises controlling switches, for example high side switch S1 and low side switch S2, of power converter 10, during normal operation.

At 21, the method comprises terminating normal operation in response to an exception condition, as explained above. At 22, the method comprises discharging a resonant capacitor by closing one of the switches, in the example of FIG. 1 low side switch S2, for at least one time period, to discharge a resonant capacitor like resonant capacitor Cr of FIG. 1.

In this respect, "discharging the resonant capacitor" does not necessarily mean a complete discharge, but may also be a discharge below a certain voltage, which for example is considered "safe". Therefore, discharging the resonant capacitor also includes a partial discharge.

Figures 3, 4:
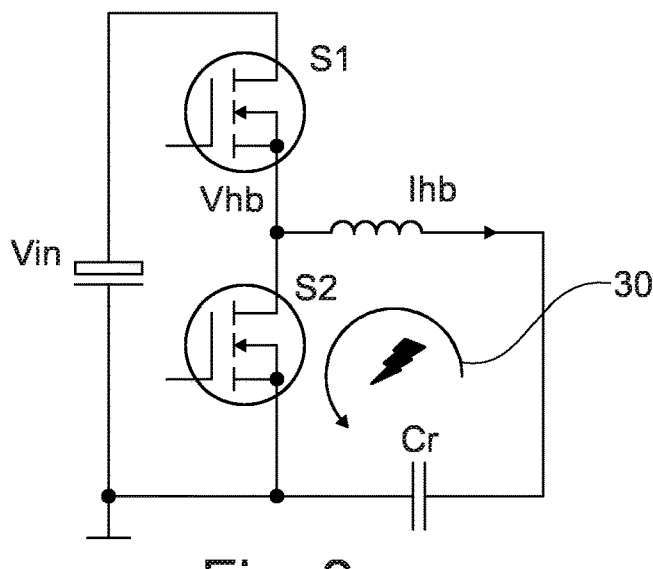
FIG. 3 is a diagram for explaining effects of some embodiments.
FIG. 4 is a diagram showing example signals for some embodiments.

The above techniques and concepts will now be explained in more detail. First of all, using the power converter 10 of FIG. 1, of which FIG. 3 shows a part, as an example, it will be explained why it is helpful to discharge the resonant capacitor.

When normal operation is terminated, in many situations (depending on the phase of operation power converter 10 is in when the termination of normal operation occurs) capacitors Cr and Cout will charged at least to some extent.

Furthermore, output capacitor Cout usually will discharge over time at least via a connected load, like the one represented by resistor R1 in FIG. 1. On the other hand, when switches S1 and S2 are open, which is the conventional case of the terminating normal operation, capacitor Cr cannot discharge, or discharge only via leakage currents, which is a very slow discharge.

When the power converter is then restarted after a comparatively short time, for example 3 seconds, resonant capacitor Cr is still charged, for example at a voltage of the order of 140 volt, while the output capacitor Cout is fully discharged. This, when low side switch S2 is switched on again for the first time, may lead to a very high reflective current on the primary side, as indicated by an arrow 30 in FIG. 3 which may lead to damages both on the primary side, for example in the switches, and on the secondary side, where also a high current for example at diode D1 may occur in some situations.

To prevent such a situation, one of the switches, in particular a switch which is in a closed loop with the resonant capacitor and at least one inductance, in case of power converter 10 low side switch S2, is closed for at least one period of time. In particular, in embodiments the switch is closed and opened repeatedly, to discharge the resonant capacitor. As in practical implementations a capacitance of capacitor Cout is significantly higher than a capacitance of resonant capacitor Cr (for example a ratio of 2000:1), the discharge of resonant capacitor Cr in this way is faster than the discharge of output capacitor Cout via the load. Therefore, at restart, a charge or voltage at resonant capacitor Cr is lower than a charge or voltage at output capacitor Cout, preventing the above described current surge. In embodiments, the opening and closing of the switch, for example low side switch S2 of FIG. 1, may be made depending on current Ihb for example measured at resistor Rs at terminal CS of controller 11, and/or based on a voltage at terminal ZCD of controller 11 received from auxiliary winding Laux, or based on other information representing the state of power converter 10, for example also depending on a voltage across capacitor Cr. In particular, the voltage provided by the auxiliary winding Laux is indicative of the voltage or at capacitor Cr, and can thus serve as a measure of the voltage at capacitor Cr. In other embodiments, the voltage may be measured directly. An example will be described referring to FIG. 4.

FIG. 4 shows example signals for a power converter like power converter 10 of FIG. 1, for the discharging of the resonant capacitor at 22 of FIG. 2 after terminating normal operation. The signal waveforms shown serve only as an example, and other implementations may have different signal waveforms.

A curve 40 illustrates an example control signal for low side switch S2. When the control signal of curve 40 is high, switch S2 is closed, and when the control signal is low, switch S2 is open.

A curve 41 illustrates the current Ihb of FIG. 1, a curve 42 illustrates an auxiliary voltage Vaux received from auxiliary winding Laux at terminal ZCD, a curve 43 represents the voltage Vhb across switch S2, and a curve 44 represents the voltage across resonant capacitor Cr. In the example of FIG. 4, the pulses during which low side switch S2 is closed according to curve 40 always have the same length. When the low side switch is closed, the absolute magnitude of Ihb increases, from about 0 to negative values in FIG. 4. When the low side switch is opened, the current Ihb goes back to 0.

In the example of FIG. 4, a next pulse follows, i.e. low side switch S2 is closed again, when Ihb again has reached a value at or near 0. In some embodiments, this current Ihb could be directly measured, the voltage across shunt resistor RS. For example, a threshold value may be set in the numerical example of FIG. 4 between 0 and −0.1 volt or, for example, and as soon as this threshold is exceeded, low side switch S2 is closed again. However, in the embodiment shown, the voltage Vaux is used to control switching of the low side switch. As can further be seen in FIG. 4, and as indicated by an arrow 45, curve 42 is essentially synchronous with pulse curve 40, i.e. the voltage Vaux shows a pulse-like behaviour corresponding to the pulses of curve 40. When Vaux goes up again, this indicates a demagnetization of primary winding Lm (and therefore zero current Ihb), at which point the next pulse of curve 40 may follow. Therefore, in some embodiments the start of the pulses is determined based on Vaux. Alternatively, a demagnetizing current may be measured at the center point between high side switch S1 and low side switch S2, and regulation may be performed based on this current, e.g. by switching on high side switch S1 again after the demagnetizing current is at zero or differs from zero by no more than a predefined threshold.

As can be seen from curve 44, in this way resonant capacitor Cr is gradually discharged.

Likewise, as seen from curve 43, the voltage Vhb across low side switch S2 essentially drops to 0 when the low side switch is closed and goes back up to a higher voltage (140 volt in this example) when the switch is open.

As further can be seen, the peak values of Vaux according to curve 42 decrease in about the same manner as curve 44. Therefore, as mentioned above, the auxiliary voltage Vaux received at terminal ZCD may also serve as a measure of the voltage across the resonant capacitor Cr according to curve 44.

As seen from curve 41, the maximum absolute current over time decreases with increasing discharge of the resonant capacitor. In embodiments, this may be used to increase the duration of the times where the low side switch is closed with decreasing charge of the capacitor, i.e. in contrast to the pulses having equal length of curve 40, the pulses have increasing length. As indicated by an arrow 46, for example the pulse may set depending on the peak voltage of the auxiliary voltage Vaux, such that the time duration increases with decreasing peak voltage of Vaux (and therefore with decreasing charge of the capacitor Cr). In other embodiments, the voltage across Capacitor Cr may be measured directly and used for regulation of the pulse length. In yet other embodiments, the measured magnitude of the negative current Ihb may be used for regulating the pulse duration. In this way, in some embodiments a faster discharge may be obtained.

When discharging the capacitor as illustrated in FIG. 4, in contrast to normal operation of the power converter, the high side switch S1 remains off all the time. Due to this, essentially no energy transfer towards the secondary side and the output occurs, but energy stored in the resonant capacitor is transferred back towards the input voltage. This is illustrated in FIGS. 5A and 5B, which show parts of power converter 10 of FIG. 1.

Figure 5A:
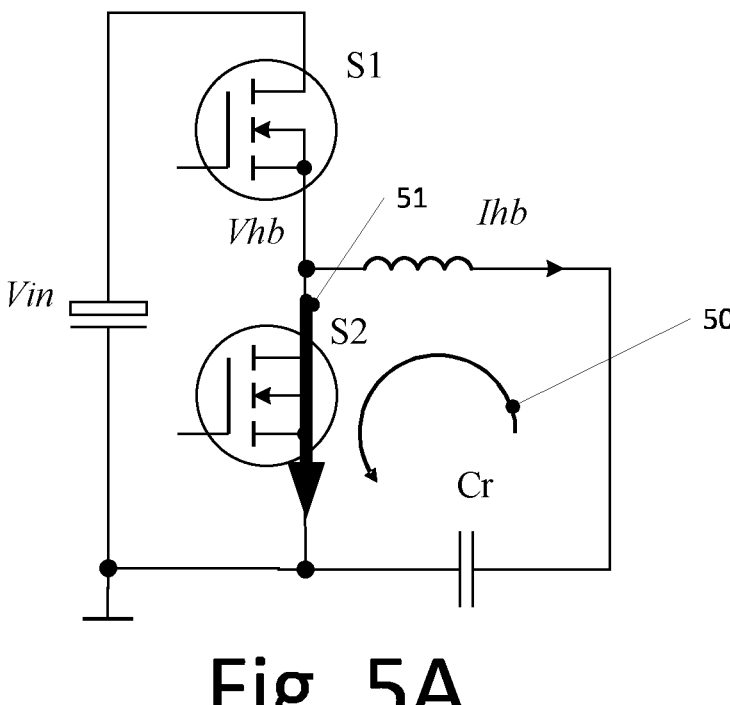
FIGS. 5A and 5B are diagrams for explaining effects of some embodiments.
Figure 5B:
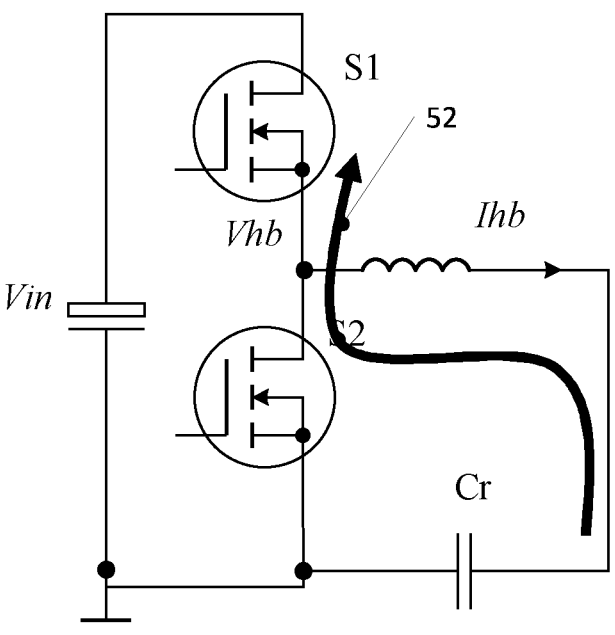

FIG. 5A shows the current flowing when switch S2 is closed, i.e. during the pulses where curve 40 of FIG. 4 is high. Here, switch S2 is conducting, such that current flows as indicated by arrows 51 and 50 in FIG. 5A. FIG. 5B then shows the situation in the phases where both high side switch and low side switch are off, i.e. during the low periods of curve 40 of FIG. 4. Here, as indicated by an arrow 52, current flows through a body diode of switch S1 towards the input voltage Vin.

Figure 6:
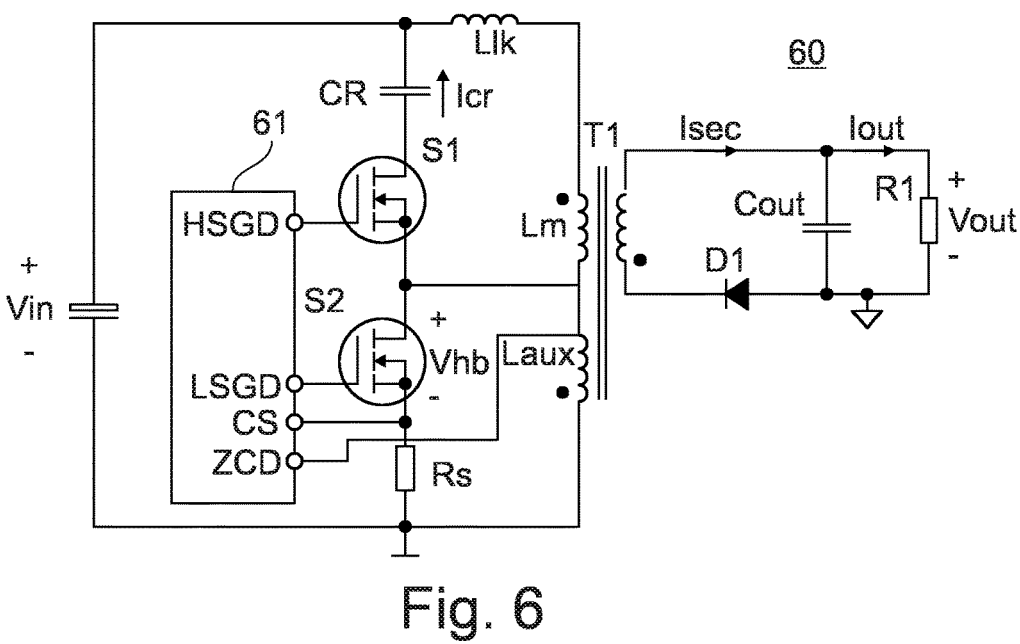
FIG. 6 is a circuit diagram of a resonant power converter according to a further embodiment, including a controller according to further embodiment.

As already mentioned, power converter 10 of FIG. 1 is merely one example where the discharge of a resonant capacitor may be implemented. FIG. 6 illustrates a resonant power converter 60 according to a further embodiment, which is configured as an active clamp flyback converter. Elements corresponding to elements of power converter 10 of FIG. 1 bear the same designations and will not be described again in detail. Instead, the differences will be described.

Essentially, compared to FIG. 1, in FIG. 6 the roles of high side switch S1 and low side switch S2 are reversed. In FIG. 6, high side switch S1 is coupled in a closed loop with resonant capacitor Cr, inductor Llk and primary side inductor Lm as shown. Therefore, controller 61 of FIG. 6 controls high side switch S1 and low side switch S2 essentially in the opposite manner compared to the case of FIG. 1. This means that during normal operation, low side switch S2 is closed to transfer energy to the resonant circuit, and then low side switch S2 is opened and high side switch S1 is closed to transfer energy to the secondary side. Similar to what was described with respect to FIG. 1, operation and control during normal operation may be implemented in any conventional manner.

For discharging resonant capacitor Cr after normal operation has been terminated, now high side switch S1 is closed for at least one time duration, in particular during a plurality of pulses.

Figure 7:
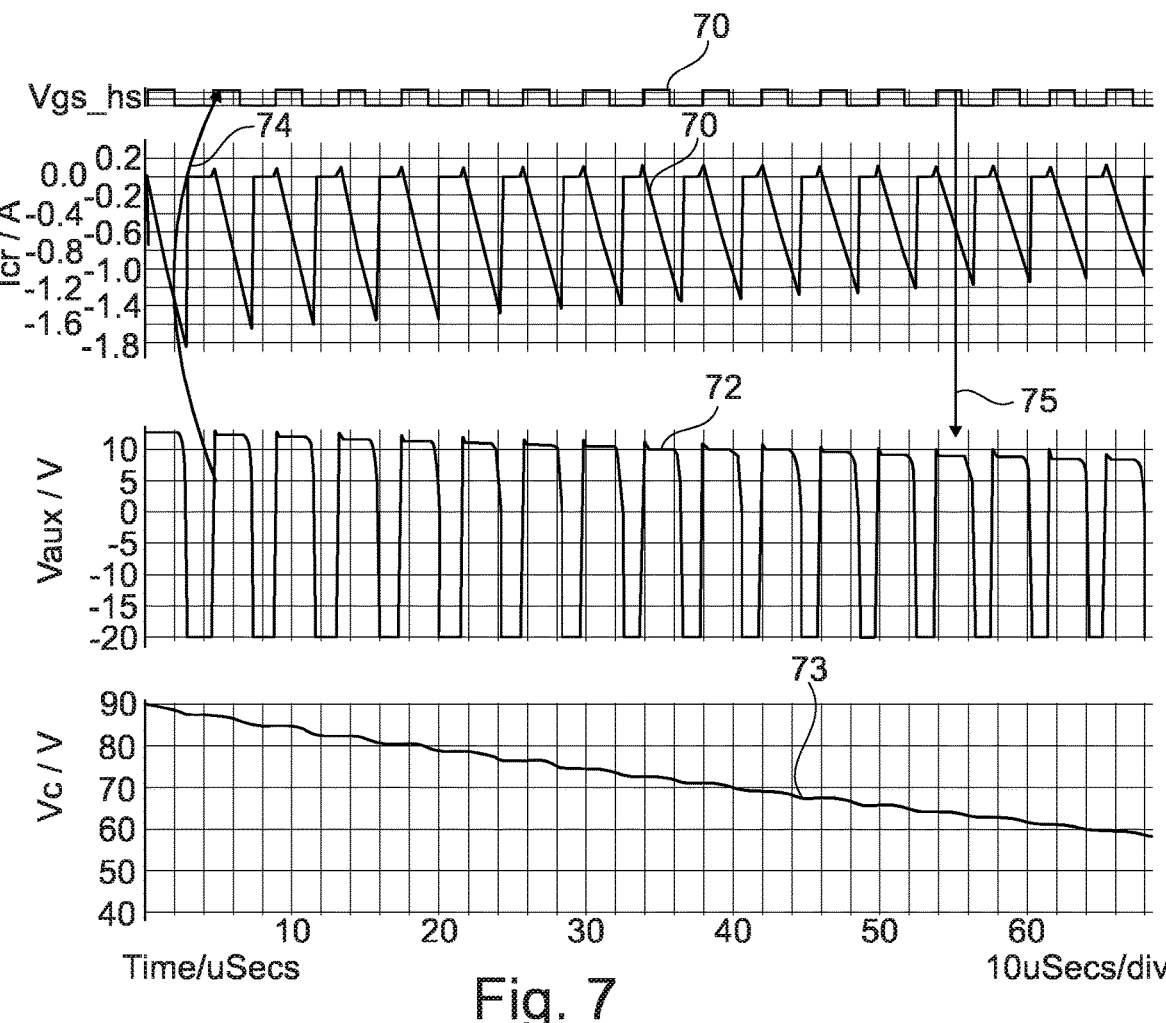
FIG. 7 is a diagram illustrating example signals for some embodiments.

FIG. 7 is a signal diagram showing example signals for power converter 60 in FIG. 6, similar to the signal diagram of FIG. 4 for power converter 10 of FIG. 1. Similar to FIG. 4, FIG. 7 shows signals after termination of normal operation for the discharge of resonant capacitor Cr of FIG. 6.

A curve 70 shows a control signal for high side switch S1, where during pulses where curve 70 is high side switch S1 is closed, and during low periods of curve 70 high side switch S1 is open. A curve 71 shows the current Icr across capacitor Cr. Current Icr has a somewhat similar behaviour to current Ihb in FIG. 4 and goes from 0 to negative values when the high side switch S1 is closed and then goes back to 0 after opening of the high side switch.

A curve 72 shows the auxiliary voltage Vaux received from the auxiliary winding Laux at terminal ZCD of controller 61. As indicated by arrow 74, pulses of curve 72 are essentially synchronous to the pulses of curve 70. A curve 73 shows the voltage at resonant capacitor Cr. As can be seen, resonant capacitor Cr is gradually discharged. Again, peak values of curve 72 follow this discharge, and therefore, as indicated by arrow 75, each pulse may be started when signal S72 indicates demagnetization of the winding, i.e. case of FIG. 7 when curve 72 goes up again.

Alternatively, similar to what was explained for FIG. 1 a demagnetizing current may be measured at the center point between high side switch S1 and low side switch S2, and regulation may be performed based on this current, e.g. by switching on high side switch S1 again after the demagnetizing current is at zero or differs from zero by no more than a predefined threshold.

Similar to what was explained for FIG. 4, also here, while in FIG. 7 curve 70 has pulses of equal length where high side switch S1 is on, these pulses may become longer with increasing discharge of capacitor Cr, for example as indicated by the voltage Vaux or also measured directly.

Therefore, as can be seen from FIGS. 6 and 7, application of the discharge techniques discussed above are not limited to the converter configuration of FIG. 1, but may also be applied to other resonant converters like the one shown in FIG. 6.

Some embodiments are defined by the following examples:

Example 1. A controller for a resonant power converter, comprising a control logic configured to:
control a high side switch and a low side switch of the power converter during normal operation,
terminate normal operation in response to determining an exception condition,
after terminating normal operation, control one of the high side switch or low side switch to close for at least one time period to discharge a resonant capacitor of the power converter.

Example 2. The controller of example 1, wherein the one of the high side switch or low side switch is coupled in a closed loop with the resonant capacitor and at least one inductance.

Example 3. The controller of example 2, wherein the controller is configured to start the at least one time period in based on a signal indicating a zero current in the closed loop.

Example 4. The controller of any one of examples 1 to 3, wherein the at least one time period comprises a plurality of time periods separated by further time periods where the at least one of the high side switch or low side switch is open.

Example 5. The controller of example 4, wherein a time duration of the plurality of time periods is the same.

Example 6. The controller of example 4, wherein the controller is configured to set the time durations of the plurality of time periods depending on a signal indicating a voltage at the resonant capacitor.

Example 7. The controller of any one of examples 1 to 6, wherein the controller is configured to start the at least one time period in based on a signal indicating a demagnetization of a primary side inductance of a transformer of the resonant power converter.

Example 8. The controller of any one of examples 1 to 7, wherein the controlling of one of the high side switch or low side switch to close for at least one time period to discharge a resonant capacitor of the power converter causes essentially no energy transfer to an output of the power converter.

Example 9. The controller of any one of examples 1 to 8, wherein the controlling of one of the high side switch or low side switch to close for at least one time period to discharge a resonant capacitor of the power converter causes energy transfer to an input of the power converter.

Example 10. A resonant power converter, comprising: the controller of any one of examples 1 to 9, a half bridge including the high side switch and the low side switch coupled between a first supply voltage potential and a second supply voltage potential, and the resonant capacitor coupled with the one of the high side switch or low side switch in a closed loop with a primary side inductance of a transformer.

Example 11. The resonant power converter of example 10, wherein the resonant power converter is one of an asymmetric half bridge flyback converter or an active clamp flyback converter.

Example 12. The resonant power converter of example 9 or 10, wherein the high side switch and the low side switch are implemented as transistor switches, wherein the controller is configured to operate at least one of the high side switch or the low side switch in at least one of the open state or closed state in a linear range of the respective transistor switch.

Example 13. A method, comprising:
controlling a high side switch and a low side switch of the power converter during normal operation,
terminating normal operation in response to determining an exception condition,
after terminating normal operation, controlling one of the high side switch or low side switch to close for at least one time period to discharge a resonant capacitor of the power converter.

Example 14. The method of example 13, wherein the one of the high side switch or low side switch is coupled in a closed loop with the resonant capacitor and at least one inductance.

Example 15. The method of example 14, further comprising starting the at least one time period in based on a signal indicating a zero current in the closed loop.

Example 16. The method of any one of examples 13 to 15, wherein the at least one time period comprises a plurality of time periods separated by further time periods where the at least one of the high side switch or low side switch is open.

Example 17. The method of example 16, wherein a time duration of the plurality of time periods is the same.

Example 18. The method of example 16, further comprising setting the time durations of the plurality of time periods depending on a signal indicating a voltage at the resonant capacitor.

Example 19. The method of any one of examples 13 to 18, further comprising starting the at least one time period in based on a signal indicating a demagnetization of a primary side inductance of a transformer of the resonant power converter.

Example 20. The method of any one of examples 13 to 19, wherein the controlling of one of the high side switch or low side switch to close for at least one time period to discharge a resonant capacitor of the power converter causes essentially no energy transfer to an output of the power converter.

Example 21. The method of any one of examples 13 to 20, wherein the controlling of one of the high side switch or low side switch to close for at least one time period to discharge a resonant capacitor of the power converter causes energy transfer to an input of the power converter.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A controller including control logic operative to:
control a high side switch and a low side switch of a resonant power converter during a normal operation mode;
terminate execution of the resonant power converter in the normal operation mode in response to determining an exception condition;
after terminating the execution of the resonant power converter in the normal operation mode, control operation of the high side switch and the low side switch for at least one time period to discharge a resonant capacitor of the resonant power converter; and wherein the at least one time period comprises a plurality of time periods separated by further time periods where the high side switch is open.

2. The controller of claim 1, wherein the high side switch and the low side switch are coupled in a closed loop circuit with the resonant capacitor and at least one inductor.

3. The controller of claim 2, wherein the controller is configured to start the at least one time period based on a signal indicating a zero current flowing in the closed loop circuit.

4. The controller of claim 1, wherein a time duration of each of the plurality of time periods is equal.

5. The controller of claim 1, wherein the controller is configured to set the time duration of each of the plurality of time periods depending on a signal indicating a voltage stored by the resonant capacitor.

6. The controller of claim 1, wherein the controller is configured to start the at least one time period based on receiving a signal indicating a demagnetization of a primary side inductance of a transformer of the resonant power converter.

7. The controller of claim 1, wherein the control operation of the high side switch and the low side switch for the at least one time period is operative to discharge the resonant capacitor of the resonant power converter where no energy is transferred from the resonant power converter to an output of the resonant power converter during the at least one time period.

8. The controller of claim 1, wherein the control operation of the high side switch and the low side switch for the at least one time period to discharge the resonant capacitor of the resonant power converter is operative to transfer energy to an input of the resonant power converter.

9. The power converter circuit of claim 8, wherein the high side switch and the low side switch are implemented as transistor switches, wherein the controller is configured to operate the high side switch and the low side switch in in a linear range.

10. A power converter circuit comprising:
   the controller of claim 1, and
   a half bridge circuit including the high side switch and the low side switch coupled between a first supply voltage potential and a second supply voltage potential, and
   wherein the resonant capacitor is coupled in a closed loop with a primary side inductance of a transformer.

11. The power converter circuit of claim 10, wherein the resonant power converter is an asymmetric half bridge flyback converter.

12. The controller of claim 1, wherein the at least one time period comprises a plurality of time periods separated by further time periods where the low side switch is controlled to an open state.

13. The controller of claim 1, wherein the at least one time period includes a first control cycle; and
   wherein the control logic is further operative to, during the control operation of the high side switch and the low side switch for the first control cycle:
      discharge the resonant capacitor via deactivation of the low side switch to an off state for a full duration of the first control cycle and activation of the high side switch to an on state for at least a portion of the first control cycle.

14. The controller of claim 13, wherein the at least one time period includes a second control cycle; and wherein the control logic is further operative to, during the operation of the high side switch and the low side switch for the second control cycle:
   discharge the resonant capacitor via deactivation of the low side switch to the off state for a full duration of the second control cycle and activation of the high side switch to an on state for at least a portion of the second control cycle.

15. The controller of claim 14, wherein the second control cycle is contiguous with the first control cycle.

16. A method comprising:
   controlling a switch of a resonant power converter during a normal operation mode;
   terminating execution of the normal operation mode in response to detecting an exception condition;
   after terminating the execution of the normal operation mode, controlling the switch for at least one time period to discharge a voltage from a resonant capacitor of the resonant power converter; and
   wherein the at least one time period comprises a plurality of time periods separated by further time periods, the method further comprising: setting time durations of the plurality of time periods depending on a received signal indicating a voltage stored in the resonant capacitor.

17. The method of claim 16, wherein the switch is coupled in a closed loop circuit with the resonant capacitor and at least one inductive component, the method further comprising starting the at least one time period based on receiving a signal indicating a zero current flowing through the closed loop circuit.

18. A controller including control logic operative to:
   control a high side switch and a low side switch of a resonant power converter during a normal operation mode;
   terminate execution of the resonant power converter in the normal operation mode in response to determining an exception condition;
   after terminating the execution of the resonant power converter in the normal operation mode, control operation of the high side switch and the low side switch for at least one time period to discharge a resonant capacitor of the resonant power converter;
   wherein the at least one time period includes a first control cycle and a second control cycle; and
   wherein the control logic is further operative to, during the control operation of the high side switch and the low side switch for the first control cycle: discharge the resonant capacitor via deactivation of the high side switch to an off state for a full duration of the first control cycle and activation of the low side switch to an on state for a less than all portion of the first control cycle; and
   wherein the control logic is further operative to, during the operation of the high side switch and the low side switch for the second control cycle: discharge the resonant capacitor via deactivation of the high side switch to the off state for a full duration of the second control cycle and activation of the low side switch to the on state for a less than all portion of the second control cycle.

19. The controller of claim 18 wherein the second control cycle is contiguous with the first control cycle.

20. A controller including control logic operative to:
   control a first switch and a second switch of a resonant power converter during a first operational mode, the first switch and the second switch connected in series, the first switch and the second switch alternatingly controlled ON and OFF during the first operational mode to supply current through a series circuit path including a resonant capacitor and a first transformer winding;

terminate execution of the resonant power converter in the first operational mode in response to detecting an exception condition; and in response to the exception condition, after terminating the execution of the resonant power converter in the first operational mode, control operation of the first switch and the second switch in accordance with a second operational mode during which the control logic is operative to: i) control operation of the first switch to an off-state for a full duration of a first control cycle, and ii) control operation of the second switch to an on-state for at least a portion of the first control cycle to discharge energy stored in the resonant capacitor of the resonant power converter.

21. The controller as in claim 20, wherein the control logic is further operative to:

after terminating the execution of the resonant power converter in the normal operational mode, and subsequent to the first control cycle, control operation of the first switch and the second switch in accordance with the second operational mode during which the control logic is operative to: i) control operation of the first switch to an off-state for a full duration of a second control cycle, and ii) control operation of the second switch to an on-state for at least a portion of the second control cycle to discharge the energy stored in the resonant capacitor of the resonant power converter.

22. The controller as in claim 20, wherein the operation of the first switch to the off-state for the full duration of the first control cycle and the operation of the second switch to the on-state for at least the portion of the first control cycle to discharge the resonant capacitor of the resonant power converter results in a magnitude of a voltage across the resonant capacitor varying between a first voltage and a second voltage; and wherein the second voltage is zero.

* * * * *